(12) United States Patent
Zhou

(10) Patent No.: US 9,215,454 B2
(45) Date of Patent: Dec. 15, 2015

(54) TESTING SYSTEM AND METHOD FOR AUDIO/VIDEO PROCESSING FUNCTION OF AUDIO/VIDEO PLAYBACK APPARATUS

(71) Applicant: Wistron Corporation, New Taipei (TW)

(72) Inventor: Yang Zhou, New Taipei (TW)

(73) Assignee: Wistron Corporation, New Taipei (TW)

( * ) Notice: Subject to any disclaimer, the term of this patent is extended or adjusted under 35 U.S.C. 154(b) by 105 days.

(21) Appl. No.: 14/156,470

(22) Filed: Jan. 16, 2014

(65) Prior Publication Data

US 2015/0103186 A1    Apr. 16, 2015

(30) Foreign Application Priority Data

Oct. 11, 2013  (CN) .......................... 2013 1 0472954

(51) Int. Cl.
  *H04N 17/00* (2006.01)
  *H04N 17/02* (2006.01)
  *H04N 17/04* (2006.01)

(52) U.S. Cl.
  CPC ............... *H04N 17/02* (2013.01); *H04N 17/04* (2013.01)

(58) Field of Classification Search
  CPC ............ H04N 21/44008; H04N 17/00; H04N 17/004; H04N 17/02; H04N 17/04; G01R 13/31701; G01R 31/31708; G01R 31/31712; G01R 31/31715; G01R 31/31703
  See application file for complete search history.

(56) References Cited

U.S. PATENT DOCUMENTS

| | | | | |
|---|---|---|---|---|
| 8,306,770 | B2 * | 11/2012 | Chen ............................. | 702/117 |
| 8,458,757 | B2 * | 6/2013 | Pham ..................... | H04N 17/00 348/180 |
| 8,499,326 | B2 * | 7/2013 | Bly, Jr. ................... | H04N 7/106 348/181 |
| 2006/0197841 | A1 | 9/2006 | Young et al. | |
| 2008/0122985 | A1 * | 5/2008 | Xie ................. | 348/701 |
| 2009/0013372 | A1 * | 1/2009 | Oakes et al. .................. | 725/139 |
| 2010/0302447 | A1 * | 12/2010 | Shirai ........................... | 348/607 |

(Continued)

FOREIGN PATENT DOCUMENTS

| | | |
|---|---|---|
| CN | 102572503 A | 7/2012 |
| CN | 202773015 | 3/2013 |
| TW | 200803463 | 1/2008 |

OTHER PUBLICATIONS

"Office Action of Taiwan Counterpart Application", issued on Jul. 17, 2015, p. 1-p. 7.

*Primary Examiner* — Victor Kostak
(74) *Attorney, Agent, or Firm* — Jianq Chyun IP Office

(57) ABSTRACT

A testing system and a method thereof are provided. The testing system includes an audio/video playback apparatus and a testing apparatus. The audio/video playback apparatus is configured to receive an audio/video signal, and analyze the audio/video signal to generate a signal analysis result and a processed audio/video signal. The processed audio/video signal is configured to be displayed on a screen of the audio/video playback apparatus. The testing apparatus includes a switching module and a determining unit. The switching module controls at least one audio/video transmission interface of the audio/video playback apparatus, so as to select and transmit the corresponding audio/video signal to the audio/video playback apparatus. When the switching module transmits the audio/video signal to the audio/video playback apparatus, the determining unit receives and analyzes the signal analysis result, so as to determine whether the processed audio/video signal is normally processed by the audio/video playback apparatus.

12 Claims, 4 Drawing Sheets

(56) References Cited

U.S. PATENT DOCUMENTS

| | | | | |
|---|---|---|---|---|
| 2011/0037857 A1* | 2/2011 | Chen | ............... | H04N 17/04 348/180 |
| 2012/0019726 A1* | 1/2012 | Arora et al. | ............... | 348/602 |
| 2014/0049650 A1* | 2/2014 | Liang | ............... | H04N 17/00 348/184 |

* cited by examiner

TESTING SYSTEM AND METHOD FOR AUDIO/VIDEO PROCESSING FUNCTION OF AUDIO/VIDEO PLAYBACK APPARATUS

CROSS-REFERENCE TO RELATED APPLICATION

This application claims the priority benefit of China application serial no. 201310472954.8, filed on Oct. 11, 2013. The entirety of the above-mentioned patent application is hereby incorporated by reference herein and made a part of this specification.

BACKGROUND OF THE INVENTION

1. Field of the Invention

The invention relates to a testing system and a method thereof, and more particularly, to a testing system and a testing method for automatically testing an audio/video signal processing function of an audio/video playback apparatus.

2. Description of Related Art

With the progress of television technologies, digital televisions nowadays are provided with various audio/video transmission interfaces such as a radio frequency (RF) interface, a video graphics array (VGA) interface, a composite video blanking and sync (CVBS) interface, a high definition multimedia interface (HDMI), a component video terminal (YPbPr) interface, and so on. The audio/video transmission interfaces provide multiple choices of image display and display qualities for a user while a signal generating apparatus (e.g., a DVD, a personal computer) is connected. With growing demands of the user to an audio/video transmission quality, it is important for manufacturers of a multimedia playback apparatus such as the digital television to quickly and accurately test an audio/video processing function of the multimedia playback apparatus and determine whether said function is normally operated.

At present days, a method for testing the audio/video processing function of the digital television include manually testing by eyes, or by capturing the screen displayed by the digital television before analyzing image displayed in the screen. However, said testing method is wasteful of manpower and cost, and prone to misjudgments. Accordingly, it is necessary to provide a testing method which is more convenient, so that the audio/video processing function of an audio/video playback apparatus such as digital televisions may be quickly tested.

SUMMARY OF THE INVENTION

The invention is directed to a testing system and a testing method, capable of automatically testing whether an audio/video signal is normally processed by an audio/video playback apparatus, so as to save manpower and cost consumed for testing.

The invention provides a testing system, and the testing system includes an audio/video playback apparatus and a testing apparatus. The audio/video playback apparatus is configured to receive an audio/video signal, analyze the audio/video signal, and generate a signal analysis result and an analyzed audio/video signal, in which the analyzed audio/video signal is used to display on a screen of the audio/video playback apparatus. The testing apparatus includes a switching module and a determining unit. The switching module controls at least one audio/video transmission interface of the audio/video playback apparatus, so as to select and transmit the corresponding audio/video signal to the audio/video playback apparatus. When the switching module transmits the audio/video signal to the audio/video playback apparatus, the determining unit receives and analyzes the signal analysis result, so as to determine whether the processed audio/video signal is normally processed by the audio/video playback apparatus.

In an embodiment of the invention, the at least one audio/video transmission interface includes a RF interface, a VGA interface, a CVBS interface, a HDMI interface and a component video terminal (YPbPr) interface.

In an embodiment of the invention, the audio/video playback apparatus executes a testing procedure. The testing procedure controls the audio/video playback apparatus through a controlling module to analyze the audio/video signal according to the at least one audio/video transmission interface.

In an embodiment of the invention, the audio/video playback apparatus includes an audio/video processing unit configured to analyze whether the audio/video signal is received, test a receiving signal intensity corresponding to the audio/video signal and a value and a chroma of each color in the audio/video signal.

In an embodiment of the invention, the audio/video playback apparatus includes an audio/video processing unit displaying the processed audio/video signal on the screen of the audio/video playback apparatus after the determining unit of the testing apparatus determines that the processed audio/video signal is normally processed by the audio/video playback apparatus.

In an embodiment of the invention, the signal analysis result includes normal signal, no signal, black frame, snowy screen/grainy, ghosting/multi-path/double image, blockiness, blurring, mosquito noise, moire/ripple, color shift and/or a combination thereof.

The invention provides a testing method, which is suitable for a testing system including an audio/video playback apparatus and a testing apparatus. The detection method includes the following steps. At least one audio/video transmission interface of the audio/video playback apparatus is controlled, so as to select and transmit the corresponding audio/video signal to the audio/video playback apparatus. A signal analysis result from the audio/video playback apparatus is received and analyzed, so as to determine whether a processed audio/video signal is normally processed by the audio/video playback apparatus. The audio/video playback apparatus is configured to receive an audio/video signal, analyze the audio/video signal, and generate a signal analysis result and an analyzed audio/video signal, in which the analyzed audio/video signal is used to display on a screen of the audio/video playback apparatus.

In summary, in the testing system and the testing method according to the embodiments of the invention, the audio/video playback apparatus is controlled through the testing apparatus, the audio/video signal corresponding to each of the audio/video transmission interfaces is tested one by one, and whether the audio/video signal is normally processed by the audio/video playback apparatus may be analyzed and determined according to the signal analysis result obtained from the audio/video signal being analyzed by the audio/video playback apparatus. Based on above, the testing system and the testing method according to the embodiments of the invention may realize the automated testing of the audio/video processing function of the audio/video playback apparatus, so as to save manpower and cost consumed for the testing.

To make the above features and advantages of the disclosure more comprehensible, several embodiments accompanied with drawings are described in detail as follows.

DESCRIPTION OF THE EMBODIMENTS

In order to realize an automated testing of an audio/video processing function of an audio/video playback apparatus, the audio/video playback apparatus capable of analyzing an audio/video signal is utilized in the embodiments of the invention. By means of controlling through a testing apparatus, an audio/video signal processing function of the audio/video playback apparatus corresponding to each of the audio/video transmission interfaces is tested one by one, and whether the audio/video signal is normally processed by the audio/video playback apparatus may be determined according to a signal analysis result of the audio/video playback apparatus. Accordingly, the automated testing for the audio/video playback apparatus may be realized with less manpower and cost. Reference will now be made in detail to the present preferred embodiments of the invention, and it will be apparent to those skilled in the art that adjustments and applications can be correspondingly made to the following embodiments without departing from the scope or spirit of the invention.

Figure 1A:
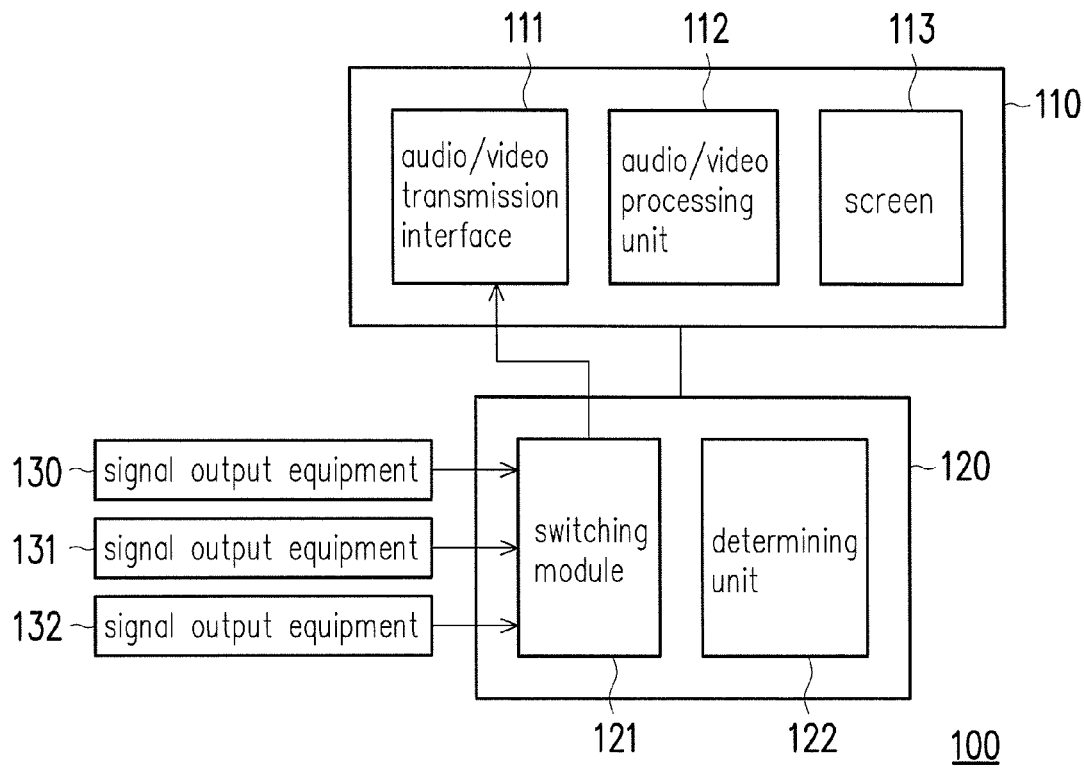
FIG. 1A is a block diagram illustrating a testing system according to an embodiment of the invention.
Figure 1B:
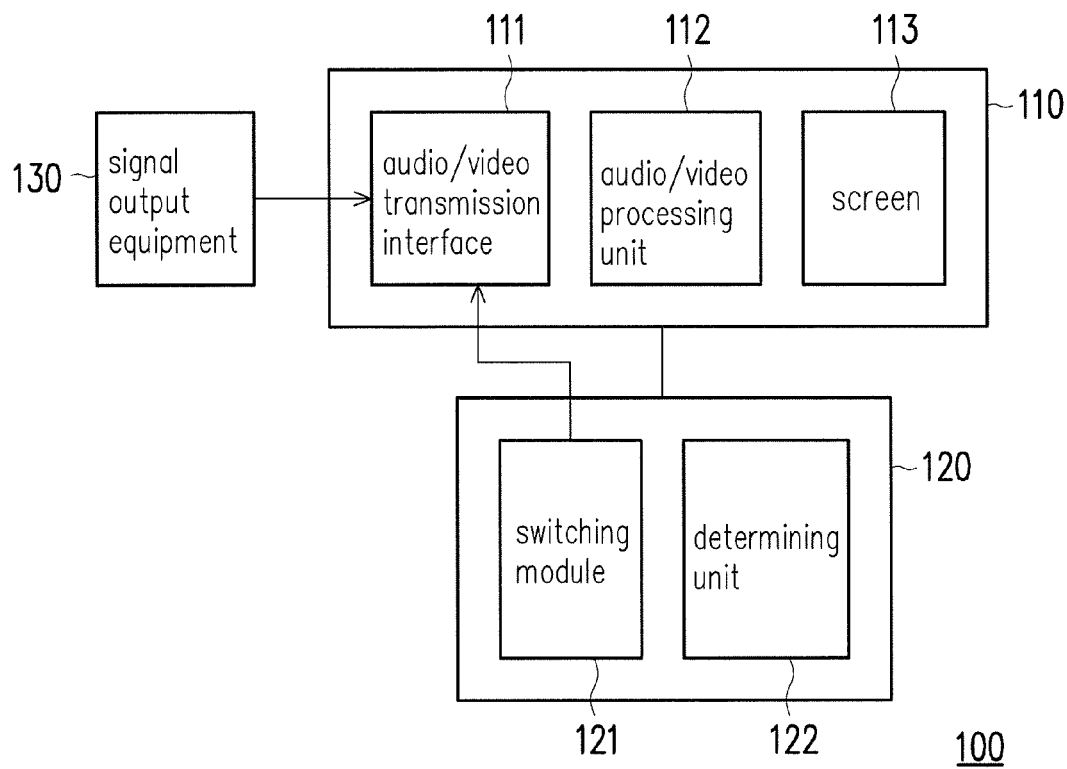
FIG. 1B is a block diagram illustrating a testing system according to an embodiment of the invention.

FIG. 1A is a block diagram illustrating a testing system according to an embodiment of the invention. Referring to FIG. 1A, a testing system 100 of the present embodiment includes an audio/video playback apparatus 110 to be tested and a testing apparatus 120. The audio/video playback apparatus 110 may be electronic apparatuses capable of displaying and analyzing the audio/video signal, such as a digital television, a tablet computer, but types thereof are not particularly limited in the invention. The audio/video playback apparatus 110 includes an audio/video transmission interface 111, an audio/video processing unit 112 and a screen 113. In the present embodiment, the audio/video playback apparatus 110 may include a plurality of audio/video transmission interfaces 111. The audio/video transmission interfaces 111 may be implemented by selecting from the following interfaces: a radio frequency (RF) interface, a video graphic array (VGA) interface, a composite video blanking and sync (CVBS) interface, a high definition multimedia interface (HDMI), a component video terminal (YPbPr) interface, and so on. In the present embodiment, the audio/video transmission interface 111 is configured to receive the audio/video signal corresponding to each of the audio/video transmission interfaces 111. The audio/video signal may come from one or more signal output equipments (e.g., 130, 131 and 132 depicted in FIG. 1A), such as a DVD player or a signal generator. In the present embodiment, the audio/video signal is, for example, transmitted by the signal output equipment 130 to a switching module 121 of the testing apparatus 120 first, and then transmitted from the switching module 121 to the corresponding audio/video transmission interface 111. In another embodiment, referring to FIG. 1B, the audio/video signal is directly transmitted from the signal output equipment 130 to the audio/video transmission interface 111. Next, the audio/video transmission interface 111 corresponding to the audio/video signal is controlled by the switching module 121 to receive the audio/video signal. Although it is illustrated herein with the signal output equipment 130 as an example, in other embodiments, multiple signal output equipments may also be used, and the invention is not limited thereto. In addition, the audio/video signal may also come from the a signal output unit or other related components built in the testing apparatus 120, and those skilled in the art may select a method for generating and transmitting the corresponding audio/video signal based on actual demands, and types of the signal output equipment are not particularly limited in the invention.

The audio/video processing unit 112 may be a processor composed of a digital television chip, a RF integrated circuit and a demodulator/decompressor, or other processing units capable of analyzing the audio/video signal. Person skilled in the art may properly select equipments for implementing the invention based on the actual demands, and the invention is not limited thereto. In the present embodiment, the audio/video processing unit 112 is configured to analyze the audio/video signal, such as analyzing whether the audio/video signal is received by the audio/video playback apparatus 110, or testing a value and a chroma of each color in the audio/video signal. Based on a result obtained from analyzing the audio/video signal, a signal analysis result and a processed audio/video signal are generated by the audio/video processing unit 112.

The screen 113 may be displays such as a liquid crystal display (LCD), a light-emitting diode (LED), but types of the displays are not particularly limited in the invention. In the present embodiment, the screen 113 is configured to receive and display the processed audio/video signal generated from the audio/video signal being analyzed by the audio/video processing unit 112.

In other words, in the testing system 100 of the present embodiment, the audio/video playback apparatus 110 receives the audio/video signal through the audio/video transmission interface 111 according to the switching module 121 of the testing apparatus 120. After the audio/video signal is analyzed by the audio/video processing unit 112, the signal analysis result and the processed audio/video signal are generated by the audio/video processing unit 112. The processed audio/video signal may be displayed on a screen 113 of the audio/video playback apparatus 110.

On the other hand, the testing apparatus 120 may be a personal computer, a work station computer or other computing devices with analyzing capability, and the invention is not limited thereto. In the present embodiment, the testing apparatus 120 may be connected to the audio/video playback apparatus 110 through a network, a wireless network or other connecting methods, so as to control at least one audio/video transmission interface 111 of the audio/video playback apparatus 110, and receive the signal analysis result generated by the audio/video processing unit 112.

More specifically, the testing apparatus 120 includes the switching module 121 and a determining unit 122. In the present embodiment, as described above, the switching module 121 is configured to control the at least one audio/video transmission interface 111 of the audio/video playback apparatus 110, so as to select and transmit the corresponding audio/video signal to the audio/video playback apparatus 110. The determining unit 122 may be a central processing unit (CPU) or other programmable devices for general purpose or special purpose such as a microprocessor and a digital signal processor (DSP), a programmable controller, an application specific integrated circuit (ASIC) or other similar elements or a combination of above-mentioned elements. In the present embodiment, when the switching module 121 transmits the audio/video signal to the audio/video playback apparatus 110, the determining unit 122 receives and analyzes the signal analysis result generated from the corresponding audio/video signal being analyzed by the audio/video signal processing unit 112, so as to determine whether the processed audio/video signal is normally processed by the audio/video playback apparatus 110.

Figure 2:
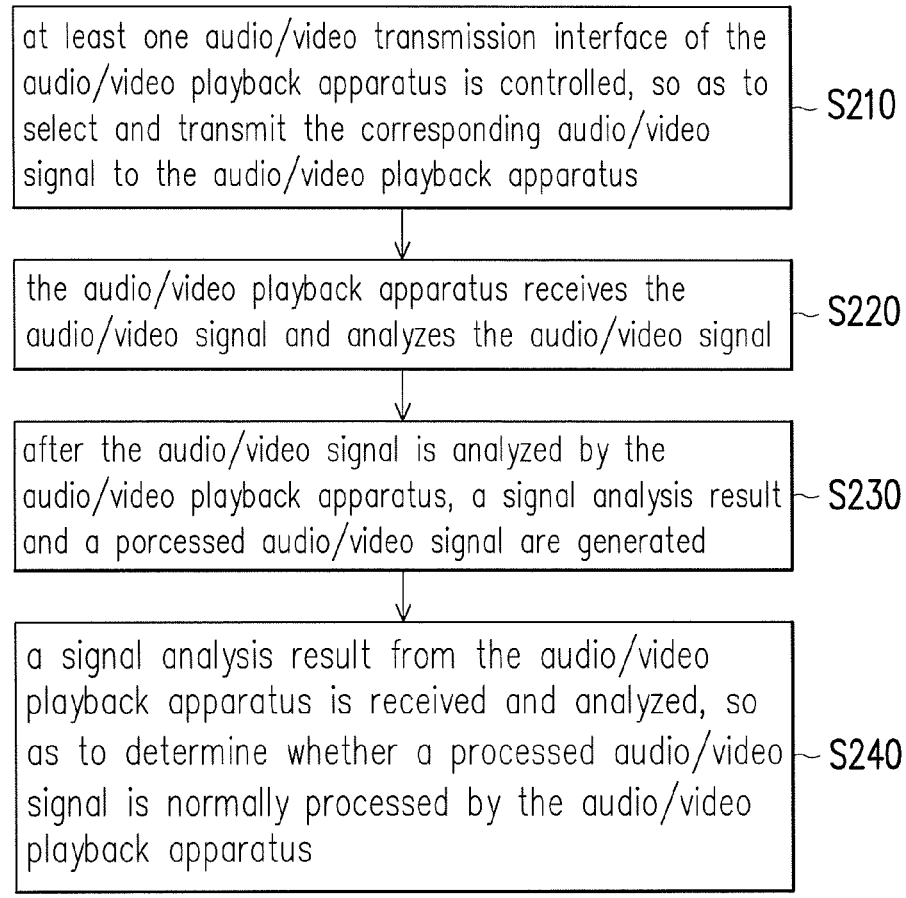
FIG. 2 is a flowchart of a testing method according to an embodiment of the invention.
Figure 3:
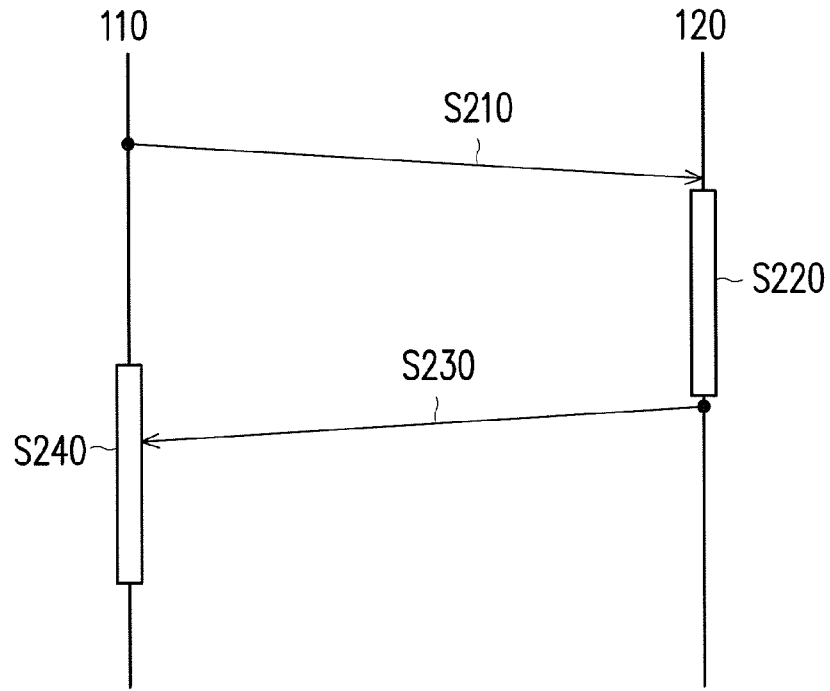
FIG. 3 illustrates an operating schematic diagram of the testing system according to an embodiment of the invention.

In the present embodiment, the testing system 100 as well as a method and a technique for implementing the same are described with reference to flowchart of FIG. 2 and schematic diagram of FIG. 3. More specifically, FIG. 2 is a flowchart of a testing method according to an embodiment of the invention, and FIG. 3 illustrates an operating schematic diagram of the testing system according to an embodiment of the invention. Therein, testing flows in both embodiments of FIG. 2 and FIG. 3 are suitable for the testing system 100 depicted in the embodiment of FIG. 1. Detailed operating steps of the embodiments of the invention are described below with reference to each component of the testing system 100 depicted in FIG. 1, the flowchart of FIG. 2 and the operating schematic diagram of FIG. 3.

Referring to FIGS. 1, 2 and 3, in step S210, the switching module 121 of the testing apparatus 120 controls the audio/video playback apparatus 110 to use the at least one audio/video transmission interface 111 of the audio/video playback apparatus 110. According to the audio/video transmission interface 111, the switching module 121 transmits the corresponding audio/video signal to the audio/video playback apparatus 110, so as to test the audio/video signal processing function of the audio/video playback apparatus 110. More specifically, in the present embodiment, the switching module 121 controls the audio/video playback apparatus 110 and selects each of the audio/video transmission interfaces 111 to be tested one by one. Next, a controlling module included in the audio/video playback apparatus 110 controls the audio/video playback apparatus 110 to execute a testing procedure according to each of the audio/video transmission interfaces 111. Accordingly, the audio/video playback apparatus 110 may analyze the audio/video signal corresponding to each of the audio/video transmission interfaces 111 one by one. In other words, the switching module 121 of the present embodiment first informs each of the audio/video transmission interfaces 111 to be tested by the controlling module, so that the controlling module may control the audio/video playback apparatus 110 to perform the corresponding audio/video signal processing. The controlling module may be, for example, a driver of the audio/video processing unit 112, or other related programs/circuits capable of controlling the audio/video processing unit 112. And it falls within a technical scope of the present embodiment as long as an operating method of the controlling module is capable of controlling the audio/video processing unit.

In step S220, the audio/video playback apparatus 110 receives the corresponding audio/video signal through the audio/video transmission interface 111, and the audio/video signal is then analyzed by the audio/video processing unit 112. It should be noted that, besides analyzing the audio/video signal for screen information required to be displayed on the screen 113, the audio/video processing unit 112 also analyzes the testing system of the present embodiment for information required in a testing of the audio/video signal processing. Furthermore, with respect to the testing of the audio/video signal processing, contents to be analyzed by the audio/video signal processing unit 112 may include analyzing whether the audio/video signal is received by the audio/video playback apparatus 110, testing a receiving signal intensity of the audio/video signal received by the audio/video playback apparatus 110, or analyzing information in the audio/video signal such as a value and a chroma of each color. In addition, as similar to the testing procedure executed by the audio/video playback apparatus 110 described above, the audio/video processing unit 112 also performs different analyzing procedures respectively corresponding to each of the audio/video transmission interfaces 111.

In step S230, after the audio/video signal is analyzed by the audio/video processing unit 110, the signal analysis result and the processed audio/video signal may be generated by the audio/video processing unit 112 of the audio/video playback apparatus 110. The signal analysis result is corresponding to above-said information required in the testing, and transmitted by the audio/video processing unit 112 to the testing apparatus 120, so as to determine whether the processed audio/video signal is normally processed by the audio/video playback apparatus 110. On the other hand, the processed audio/video signal may be transmitted to the screen 113, and images corresponding to the processed audio/video signal are displayed on the screen 113.

It should be noted that, when the audio/video processing unit 112 transmits the signal analysis result to the testing apparatus 120, the signal analysis result is also received by the controlling module first, and transmitted by the controlling module to the testing apparatus 120. Accordingly, the test procedure to one specific audio/video transmission interface 111 is completed by the audio/video playback apparatus 110.

Figure 4A:
FIGS. 4A to 4F are schematic diagrams illustrating the signal analysis result according to an embodiment of the invention.
Figure 4B:
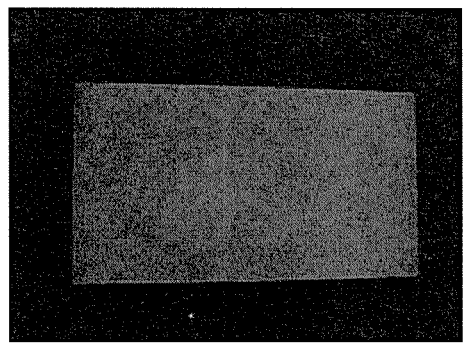
Figure 4C:
Figure 4D:
Figure 4E:
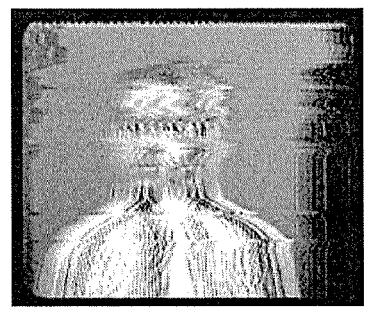
Figure 4F:
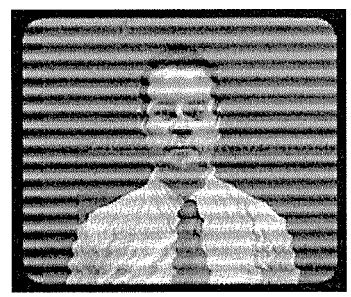

In step S240, the signal analysis result from the audio/video playback apparatus 110 is received by the determining unit 122 of the testing apparatus 120, and the signal analysis result is then analyzed to determine whether the processed audio/video signal is normally processed by the audio/video playback apparatus 110. More specifically, analysis to the signal analysis result performed by the determining unit 122 may include conditions which may be encountered during transmissions of various audio/video signals. FIGS. 4A to 4F are schematic diagrams illustrating the signal analysis result according to an embodiment of the invention. FIG. 4A is an image displayed according to the processed audio/video in which the audio/video signal is normally processed, and FIGS. 4B to 4F are images displayed according to the processed audio/video signal in which the audio/video signal is abnormally processed. Referring to FIG. 4A to FIG. 4F, the signal analysis result may be normal signal (as shown in FIG. 4A), no signal, black frame (as shown in FIG. 4B), snowy screen/grainy (as shown in FIG. 4C), ghosting/multi-path/double image (as shown in FIG. 4D and FIG. 4E), blockiness, blurring, mosquito noise, moire/ripple (as shown in FIG. 4F), color shift and/or a combination thereof.

Accordingly, in the embodiment of the invention, the digital audio/video playback apparatus is controlled through the testing apparatus, the audio/video signal corresponding to each of the audio/video transmission interfaces is tested one by one, and whether the audio/video signal is normally processed by the audio/video playback apparatus may be analyzed and determined by the testing apparatus according to the signal analysis result obtained from the audio/video signal being analyzed by the audio/video playback apparatus.

It should be emphasized that in the present embodiment, above-said testing procedure is used to determine whether the audio/video signal is normally processed by the audio/video playback apparatus 110. In some of the embodiments, after the audio/video signal processing of the audio/video playback apparatus 110 is tested by the testing system 100 according to the embodiments of the invention, the processed audio/video signal corresponding to one of the audio/video transmission interfaces 111 may be selected for testing rear circuits and displaying functions of the audio/video playback apparatus 110. More specifically, the audio/video playback apparatus 110 transmits the processed audio/video signal to be displayed on the screen 113, and image analysis may then be perform by testing manually, or by using a camera for capturing the images. Accordingly, the rear circuits of the audio/video playback apparatus 110 (i.e., an audio/video signal channel between the audio/video processing unit 120 and the screen 113) may be tested to ensure that the rear circuits and the displaying functions of the audio/video playback apparatus 110 are normally operated.

In summary, in the testing system and the testing method according to the embodiments of the invention, the audio/video playback apparatus is controlled through the testing apparatus, the audio/video signal corresponding to each of the audio/video transmission interfaces is tested one by one, and whether the audio/video signal is normally processed by the audio/video playback apparatus may be analyzed and determined according to the signal analysis result obtained from the audio/video signal being analyzed by the audio/video playback apparatus. Therein, the audio/video playback apparatus may also execute the testing procedure to control the audio/video playback apparatus, and enables the analysis of the audio/video signal for different one of the audio/video transmission interfaces. In addition, after it is ensured that the audio/video signal is normally processed by the audio/video playback apparatus through the testing system and testing method according to the embodiments of the invention, an operating status of the rear circuits of the audio/video playback apparatus may be further tested. Based on above, the testing system and the testing method according to the embodiments of the invention may realize the automated testing of the audio/video processing function of the audio/video playback apparatus, so as to save manpower and cost consumed for the testing.

What is claimed is:

1. A testing system, comprising:
   an audio/video playback apparatus, configured to receive an audio/video signal, and analyze the audio/video signal to generate a signal analysis result and a processed audio/video signal, wherein the signal analysis result is corresponding to information required in testing, wherein the processed audio/video signal is configured to be displayed on a screen of the audio/video playback apparatus; and
   a testing apparatus, comprising:
   a switching module, controlling at least one audio/video transmission interface of the audio/video playback apparatus, so as to select and transmit the corresponding audio/video signal to the audio/video playback apparatus; and
   a determining unit, receiving and analyzing the signal analysis result when the switching module transmits the audio/video signal to the audio/video playback apparatus, so as to determine whether the processed audio/video signal is normally processed by the audio/video playback apparatus.

2. The testing system of claim 1, wherein the at least one audio/video transmission interface comprises a radio frequency interface, a video graphic array interface, a composite video blanking and sync interface, a high definition multimedia interface and a component video terminal interface.

3. The testing system of claim 1, wherein the audio/video playback apparatus executes a testing procedure, and the testing procedure controls the audio/video playback apparatus through a controlling module to analyze the audio/video signal according to the at least one audio/video transmission interface.

4. The testing system of claim 1, wherein the audio/video playback apparatus comprises an audio/video processing unit configured to analyze whether the audio/video signal is received, test a receiving signal intensity corresponding to the audio/video signal and a value and a chroma of each color in the audio/video signal.

5. The testing system of claim 1, wherein the audio/video playback apparatus comprises an audio/video processing unit displaying the processed audio/video signal on the screen of the audio/video playback apparatus after the determining unit of the testing apparatus determines that the processed audio/video signal is normally processed by the audio/video playback apparatus.

6. The testing system of claim 1, wherein the signal analysis result comprises normal signal, no signal, black frame, snowy screen/grainy, ghosting/multi-path/double image, blockiness, blurring, mosquito noise, moire/ripple, color shift and/or a combination thereof.

7. A testing method, suitable for a testing system including an audio/video playback apparatus and a testing apparatus, and the testing method comprises:
   controlling at least one audio/video transmission interface of the audio/video playback apparatus, so as to select and transmit the corresponding audio/video signal to the audio/video playback apparatus; and
   receiving and analyzing a signal analysis result from the audio/video playback apparatus, so as to determine whether a processed audio/video signal is normally processed by the audio/video playback apparatus, wherein the signal analysis result is corresponding to information required in testing;
   wherein the audio/video playback apparatus receives the audio/video signal, and analyzes the audio/video signal to generate the signal analysis result and the processed audio/video signal, wherein the processed audio/video signal is configured to be displayed on a screen of the audio/video playback apparatus.

8. The testing method of claim 7, wherein the at least one audio/video transmission interface comprises a radio frequency interface, a video graphic array interface, a composite video blanking and sync interface, a high definition multimedia interface and a component video terminal interface.

9. The testing method of claim 7, wherein the audio/video playback apparatus executes a testing procedure, and the testing procedure controls the audio/video playback apparatus through a controlling module to analyze the audio/video signal according to the at least one audio/video transmission interface.

10. The testing method of claim 7, wherein the audio/video playback apparatus comprises an audio/video processing unit configured to analyze whether the audio/video signal is received, test a receiving signal intensity corresponding to the audio/video signal and a value and a chroma of each color in the audio/video signal.

11. The testing method of claim 7, wherein the audio/video playback apparatus comprises an audio/video processing unit displaying the processed audio/video signal on the screen of the audio/video playback apparatus after the testing apparatus determines that the processed audio/video signal is normally processed by the audio/video playback apparatus.

12. The testing method of claim 7, wherein the signal analysis result comprises normal signal, no signal, black frame, snowy screen/grainy, ghosting/multi-path/double image, blockiness, blurring, mosquito noise, moire/ripple, color shift and/or a combination thereof.

* * * * *